United States Patent
Veeningen

(10) Patent No.: US 9,658,130 B2
(45) Date of Patent: May 23, 2017

(54) BLOWOUT PREVENTER MONITORING SYSTEM AND METHOD OF USING SAME

(71) Applicant: National Oilwell Varco, L.P., Houston, TX (US)

(72) Inventor: Daniel Marco Veeningen, West University Place, TX (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 0 days.

(21) Appl. No.: 14/443,355

(22) PCT Filed: Nov. 27, 2013

(86) PCT No.: PCT/US2013/072297
§ 371 (c)(1),
(2) Date: May 15, 2015

(87) PCT Pub. No.: WO2014/085628
PCT Pub. Date: Jun. 5, 2014

(65) Prior Publication Data
US 2015/0292980 A1 Oct. 15, 2015

Related U.S. Application Data

(60) Provisional application No. 61/731,416, filed on Nov. 29, 2012.

(51) Int. Cl.
*G01N 21/00* (2006.01)
*G01M 11/08* (2006.01)
(Continued)

(52) U.S. Cl.
CPC ......... *G01M 11/085* (2013.01); *E21B 33/064* (2013.01); *E21B 47/0001* (2013.01);
(Continued)

(58) Field of Classification Search
CPC ........ G01M 11/08; E21B 47/00; E21B 34/04; E21B 23/00; E21B 7/00; G06F 19/00;
(Continued)

(56) References Cited

U.S. PATENT DOCUMENTS 7,367,396 B2   5/2008   Springett et al.
7,814,979 B2   10/2010  Springett et al.
(Continued)

FOREIGN PATENT DOCUMENTS

| GB | 2182180 | 7/1987 |
|----|---------|--------|
| WO | 2011039592 | 7/2011 |
| WO | 2014085628 | 6/2014 |

OTHER PUBLICATIONS

International Preliminary Report on Patentability for PCT Patent Application No. PCT/US2013/072297 dated Jun. 2, 2015, 8 pages.

(Continued)

*Primary Examiner* — Tarifur Chowdhury
*Assistant Examiner* — Jamil Ahmed
(74) *Attorney, Agent, or Firm* — Conley Rose, P.C.

(57) ABSTRACT

A monitoring system for a subsea blowout preventer is provided. The monitoring system includes a fiber optic cable (435) wrapped around preventer portions to be monitored such as rams, pistons, cylinders, housing, connector, to capture acoustic emissions from those portions during operation. The preventer is tested to determine a baseline or fingerprint of normal operation. The acoustic emissions captured during operation are compared with the baseline to detect potential anomalies that may indicate a problem.

25 Claims, 17 Drawing Sheets

(51) Int. Cl.
*E21B 33/064* (2006.01)
*E21B 47/00* (2012.01)
*E21B 47/12* (2012.01)
*G01V 8/16* (2006.01)

(52) U.S. Cl.
CPC ............ *E21B 47/12* (2013.01); *E21B 47/123* (2013.01); *G01V 8/16* (2013.01)

(58) Field of Classification Search
CPC ........... G10K 11/18; H04B 11/00; G01J 3/44; G01B 11/16
See application file for complete search history.

(56) References Cited

U.S. PATENT DOCUMENTS

| | | | |
|---|---|---|---|
| 2008/0289876 A1* | 11/2008 | King | E21B 44/00 175/40 |
| 2010/0315630 A1* | 12/2010 | Ramos | G01D 5/3537 356/301 |
| 2011/0000670 A1 | 1/2011 | Springett et al. | |
| 2011/0116075 A1* | 5/2011 | Guichard | B64D 43/00 356/32 |
| 2012/0176597 A1* | 7/2012 | Asokan | G01K 11/3206 356/32 |
| 2012/0181045 A1* | 7/2012 | Thomas | E21B 17/003 166/378 |
| 2012/0197527 A1* | 8/2012 | McKay | E21B 41/0007 702/6 |
| 2012/0273211 A1 | 11/2012 | Choudhury et al. | |
| 2012/0275274 A1* | 11/2012 | Gochnour | H04B 11/00 367/134 |

OTHER PUBLICATIONS

International Search Report and Written Opinion for PCT Patent Application No. PCT/US2013/072297 dated Feb. 12, 2015, 11 pages.

Wild et al. "Acousto-ultrasonic optical fiber sensors: Overview and state-of-the-art", IEEE Sensors Journal 2008, vol. 8, No. 7, pp. 1184-1193.

Morey et ai., "Applications of fiber grating sensors", Proceedings of SPIE—The International Society for Optical Engineering, Fiber Optic and Laser Sensors XIV, Denver, Colorado USA, Aug. 7-9, 1996, vol. 2839, pp. 2-7.

Chapman et ai., "Deepwater BOP Control Monitoring—Improving BOP Preventive Maintenance With control Function Monitoring", OTC paper 20059, 2009 Offshore Technology Conference, Houston, Texas, USA, May 4-7, 2009.

* cited by examiner

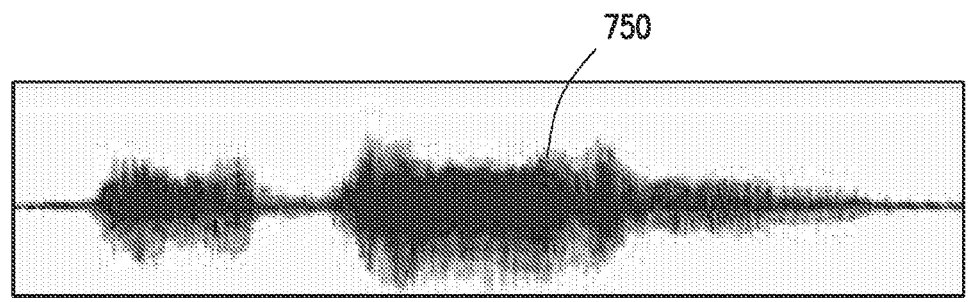
FIG. 7A1
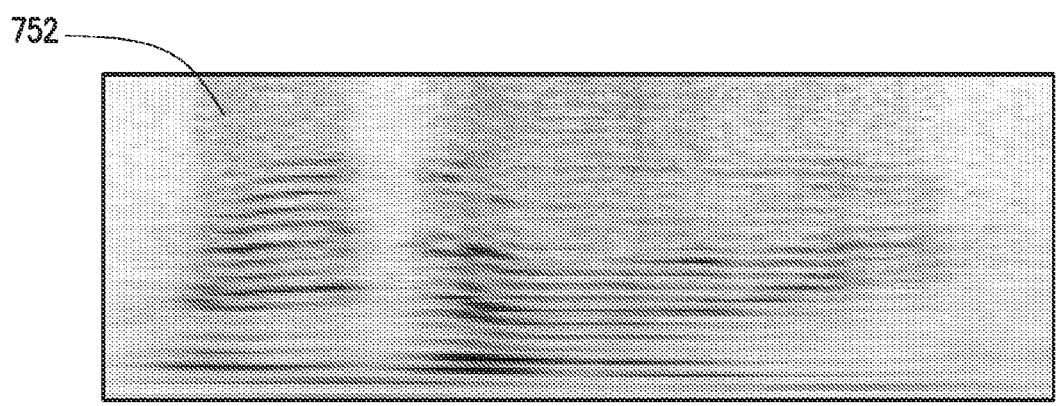
FIG. 7A2
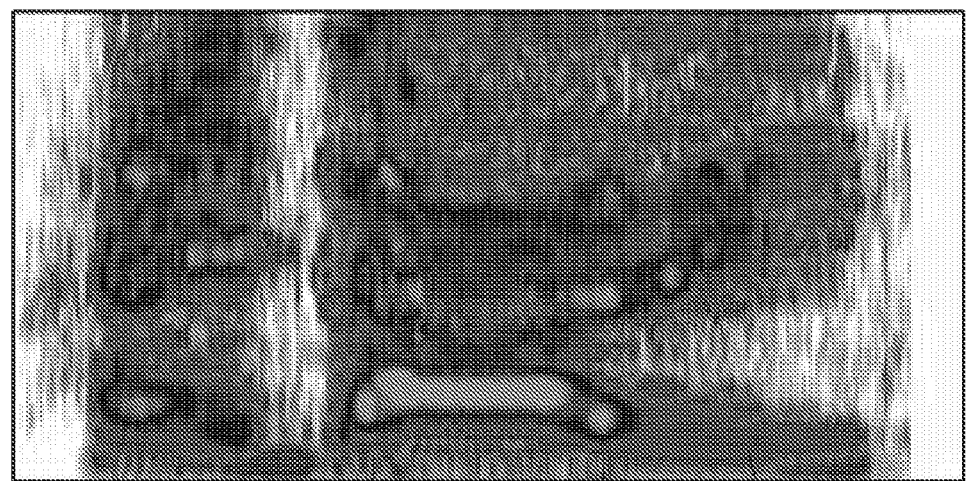
FIG. 7A3

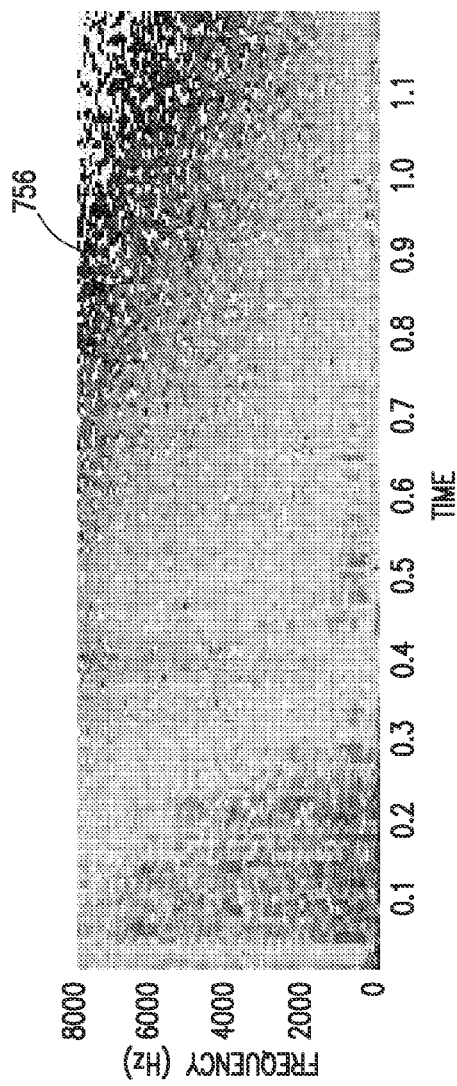
FIG. 7B1
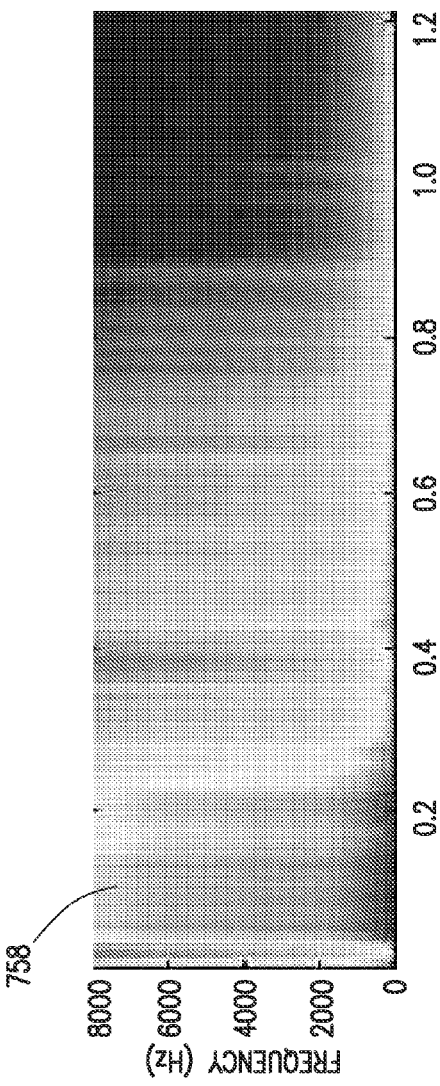
FIG. 7B2

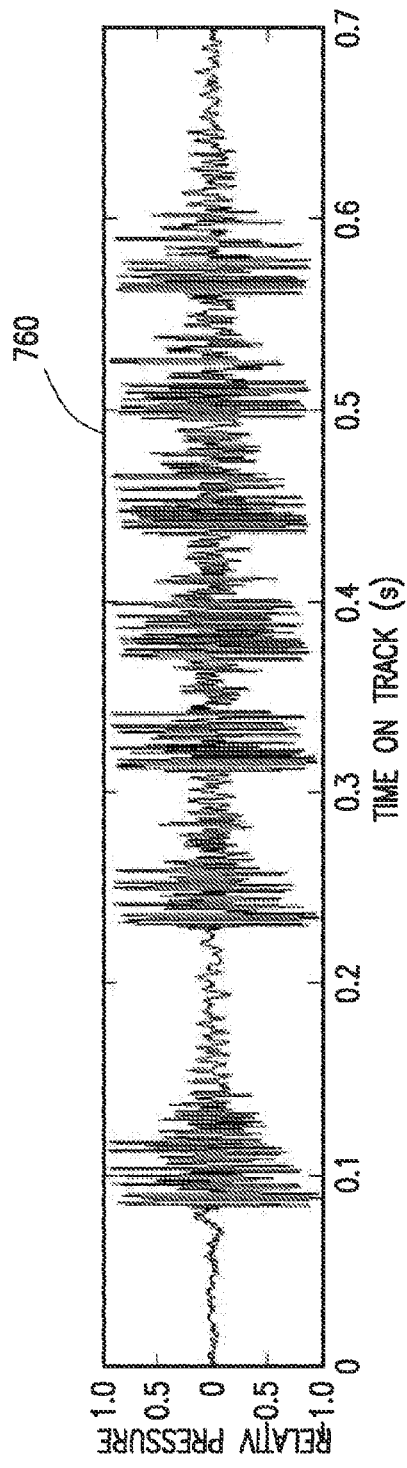
FIG. 7C1
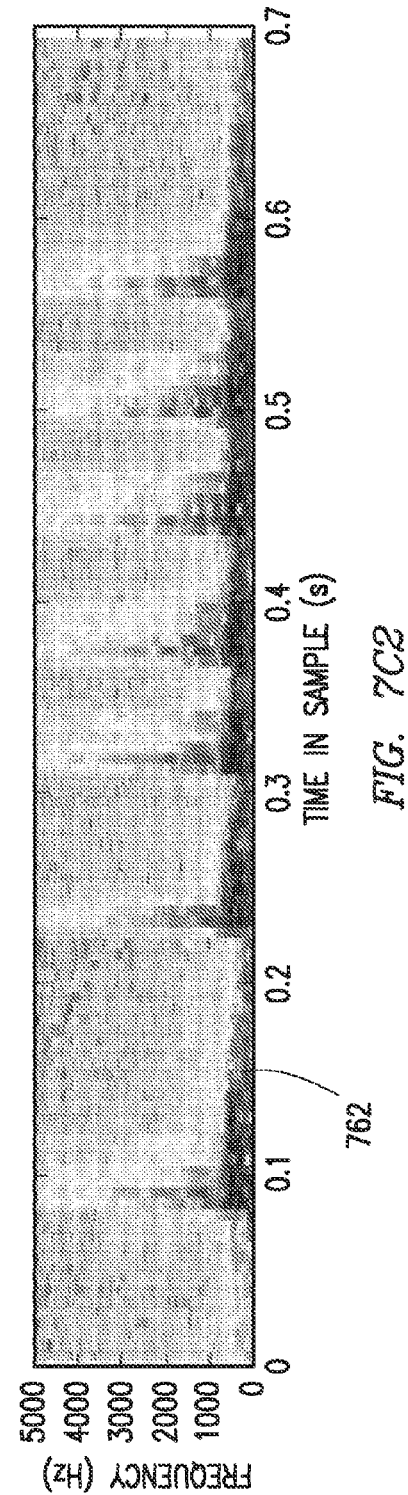
FIG. 7C2

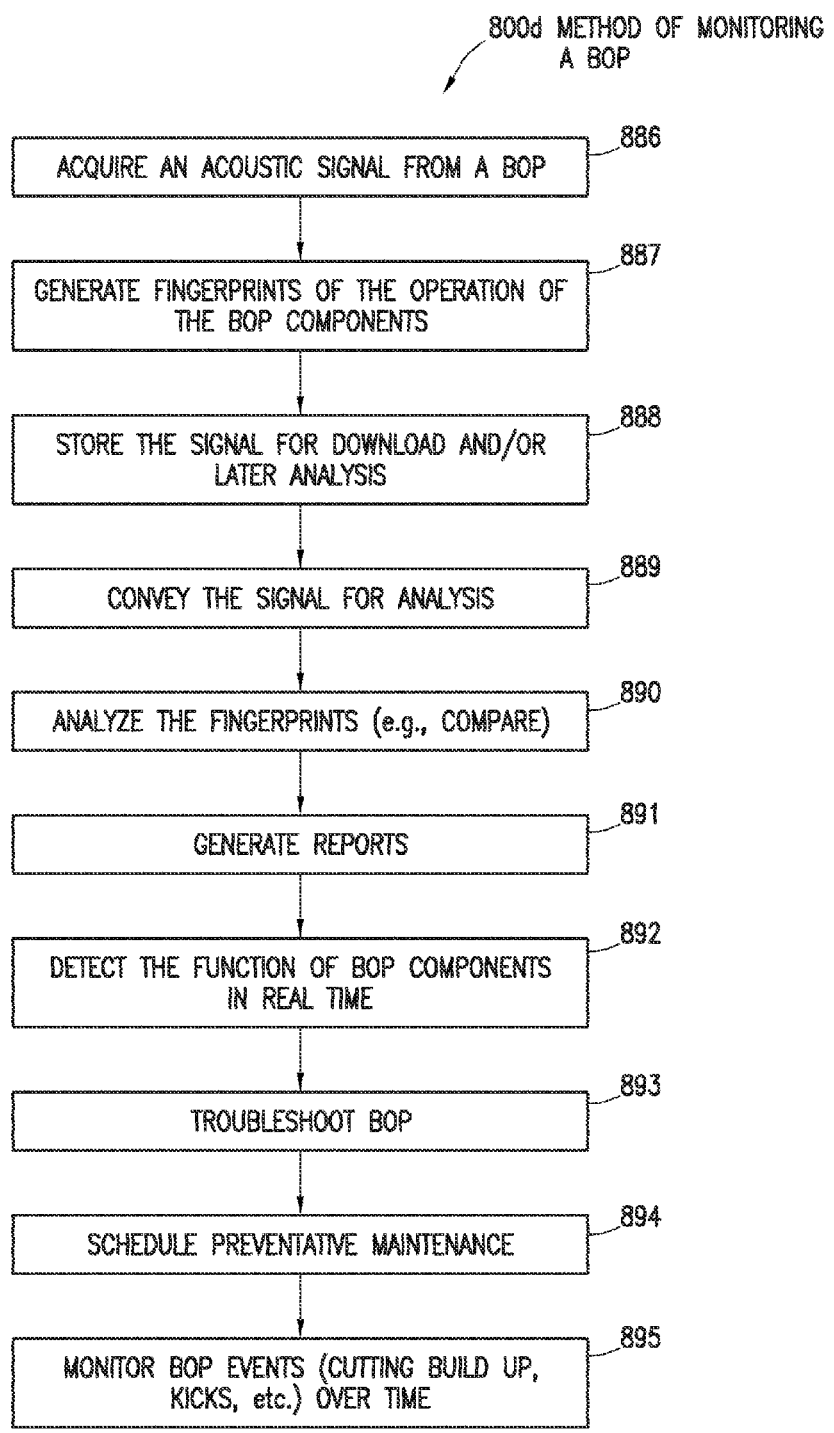

BLOWOUT PREVENTER MONITORING SYSTEM AND METHOD OF USING SAME

CROSS-REFERENCE TO RELATED APPLICATION

This application is a national phase application of PCT Application No. PCT/US2013/072297 which claims priority to U.S. Provisional Application No. 61/731,416 filed on Nov. 29, 2012, the entire contents of which are hereby incorporated by reference.

BACKGROUND

This present disclosure relates generally to techniques for performing wellsite operations. More specifically, the present disclosure relates to techniques for monitoring equipment designed to prevent blowouts.

Oilfield operations may be performed to locate and gather valuable downhole fluids. Oil rigs are positioned at wellsites, and downhole tools, such as drilling tools, are deployed into the ground to reach subsurface reservoirs. Once the downhole tools form a wellbore to reach a desired reservoir, casings may be cemented into place within the wellbore, and the wellbore completed to initiate production of fluids from the reservoir. Downhole tubular devices, such as pipes, certain downhole tools, casings, drill pipe, liner, coiled tubing, production tubing, wireline, slickline, or other tubular members positioned in the wellbore, and associated components, such as drill collars, tool joints, drill bits, logging tools, packers, and the like, (referred to as 'tubulars' or 'tubular strings') may be positioned in the wellbore to enable the Leakage of subsurface fluids may pose an environmental threat if released from the wellbore. Equipment, such as blow out preventers (BOPs), may be positioned about the wellbore to form a seal about the tubular therein to prevent leakage of fluid as it is brought to the surface. BOPs may have selectively actuatable rams (or ram bonnets), such as pipe rams or shear rams, that may be activated to seal and/or sever the tubular in a wellbore. Some examples of BOPs for severing tubulars are provided in U.S. Patent/Application No. 20110000670; U.S. Pat. Nos. 7,814,979; and 7,367,396. In some cases, it may be necessary to maintain the BOP, for example, when the BOP does not perform as desired or when a part fails on a BOP.

SUMMARY

In at least one aspect, the disclosure relates to a monitoring system for a blowout preventer positionable about a wellbore. The blowout preventer includes a housing for receiving a tubing and engagers to engage the tubular. The monitoring system includes a fiber optic cable comprising a blowout preventer cable and a communication cable. The blowout preventer cable is positionable about the blowout preventer to receive data therefrom. The communication cable is linkable between the blowout preventer portion and the surface unit to pass signals therebetween whereby blowout preventer events are detectable.

The blowout preventer cable may be wrapped about portions of the blowout preventer to define windings with intervals therebetween, for example with intervals of 1 m. The monitoring system may also include a data storage device operatively coupled to the fiber optic cable to receive data therefrom. The blowout preventer cable may be wrapped about portions of the blowout preventer. The portions may include a ram, a piston, a cylinder, an annular, the housing, and/or a wellhead connector. The blowout preventer cable may be operatively connectable about an accumulator, a lower marine riser package, and/or a wellhead.

The monitoring system may also include a test system operatively connectable to the blowout preventer and the fiber optic cable to measure a fingerprint thereof. The test system includes a test stump to receive the portion of the blowout preventer and a data acquisition to receive data from the blowout preventer. The monitoring system may also include a data acquisition system operatively connectable to the data storage device by the monitor cable. The fiber optic cable may include a cable jacket, wiring, fiber optic cables, communication lines, and an outer jacket. The blowout preventer cable may be positionable in a groove about the housing of the blowout preventer.

In another aspect, the disclosure relates to a method of monitoring a blowout preventer positionable about a wellbore. The blowout preventer includes a housing for receiving a tubing and engagers to engage the tubular. The method involves providing a monitoring system and measuring blowout preventer parameters of the blowout preventer with the monitoring system. The monitoring system includes a fiber optic cable comprising a blowout preventer cable and a communication cable. The blowout preventer cable is positionable about the blowout preventer to receive data therefrom. The communication cable is linkable between the blowout preventer portion and the surface unit to pass signals therebetween.

The blowout preventer parameters may include acoustic measurements. The method may also involve analyzing the blowout preventer parameters, detecting changes in the blowout preventer by determining changes in the parameters over time, detecting wear of the blowout preventer over time, scheduling maintenance based on the detecting, generating outputs from the blowout preventer parameters (the outputs including acoustic amplitude, spectrogram, frequency, modeled spectrogram, and actual spectrogram), comparing the outputs, operatively connecting the monitoring system to a test system and measuring baseline parameters with the monitoring system, comparing the blowout preventer parameters with the baseline parameters, and/or measuring comprises performing data acquisition in a feedback loop.

Finally, in another aspect, the disclosure relates to a method of monitoring a blowout preventer positionable about a wellbore. The blowout preventer includes a housing for receiving a tubing and engagers to engage the tubular. The method involves generating a fingerprint of the blowout preventer by operatively connecting the blowout preventer to a test stump and measuring a signal of the blowout preventer with a fiber optic cable, positioning the blowout preventer about the wellbore with the tubing therethrough, generating a signal of the blowout preventer by linking the fiber optic cable to the blowout preventer after the positioning, and comparing the signal with the fingerprint.

The may also involve monitoring blowout preventer events from the comparing over time and/or passing a signal from the blowout preventer to a surface unit.

BRIEF DESCRIPTION OF THE DRAWINGS

The appended drawings illustrate example embodiments and are, therefore, not to be considered limiting of its scope. The figures are not necessarily to scale and certain features, and certain views of the figures may be shown exaggerated in scale or in schematic in the interest of clarity and conciseness.

FIGS. 7A1-7A3 are graphical depictions of spectrograms of a BOP monitoring system.

FIGS. 7B1 and 7B2 are graphical depictions of spectrograms of a BOP monitoring system.

FIGS. 7C1 and 7C2 are graphical depictions of a graph and a spectrogram of a BOP monitoring system.

FIGS. 8A-8E are flow charts depicting various methods of monitoring a BOP.

DETAILED DESCRIPTION

The description that follows includes exemplary apparatus, methods, techniques, and/or instruction sequences that embody techniques of the present subject matter. However, it is understood that the described embodiments may be practiced without these specific details.

Blowout preventers (BOPS) may be positioned about a tubular to provide a seal therewith and/or to sever the tubular, for example, during a blowout. To detect and/or prevent BOP failures, it may be desirable to monitor various portions of the BOP system. A BOP monitoring system is provided with fiber optic cable to measure various BOP parameters and/or to detect potential BOP anomalies that may indicate a problem in the BOP operation. Fingerprints of the BOP can be taken at various intervals (e.g., at manufacture, at a stump test, at the wellsite) to monitor and/or confirm current performance, and/or to compare performance with previous operations. The BOP monitoring system may include sensors, processors, controllers, and other devices to measure, analyze, report, adjust and/or otherwise interact with the BOP system.

Figure 1A:
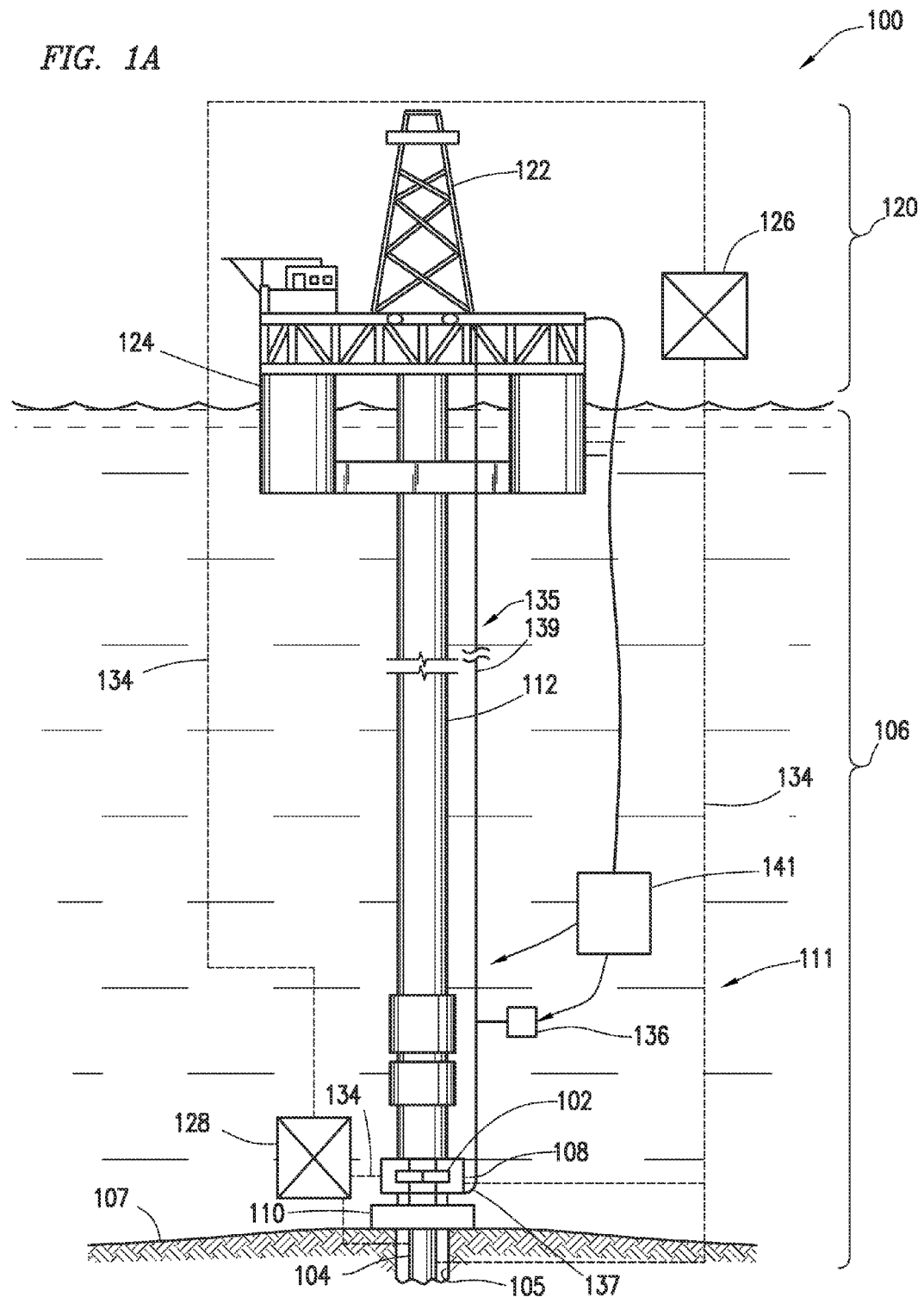
FIGS. 1A and 1B depict schematic views of an offshore wellsite having a blowout preventer (BOP) with a monitoring system.
Figure 1B:
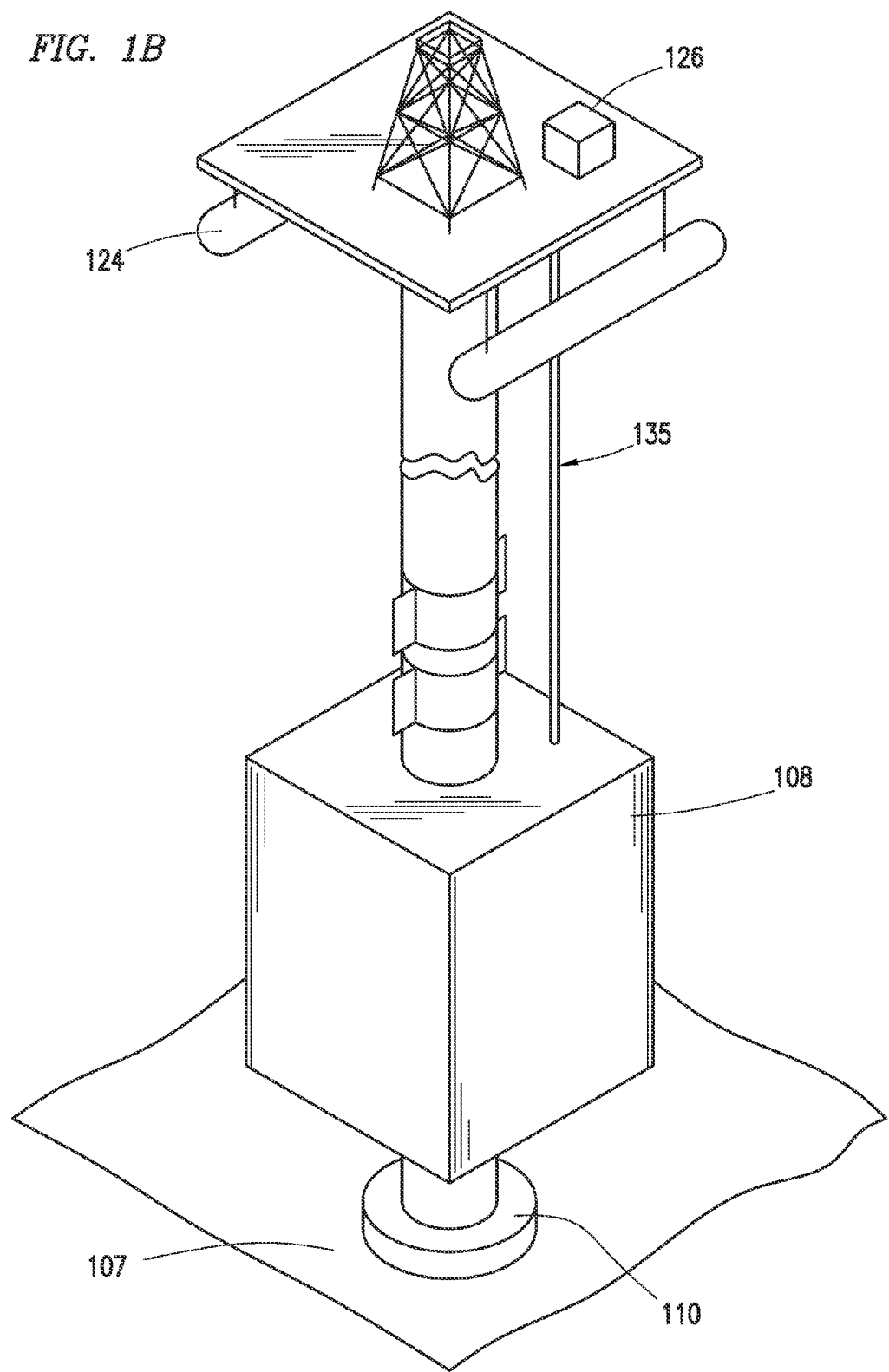

FIGS. 1A and 1B depict schematic front and perspective views of an offshore wellsite 100 with a BOP 108. While FIGS. 1A and 1B are described herein as being used in subsea operations, it will be appreciated that the wellsite 100 may be land or water based. The wellsite 100 has a subsea system 106 and a surface system 120. The surface system 120 may be used to facilitate the oilfield operations at the offshore wellsite 100. The surface system 120 may include a rig 122, a platform 124 (or vessel) and a surface controller (or unit) 126.

The subsea system 106 includes a riser 112 extending from the platform 124 to a sea floor 107. The subsea system 106 further includes a wellhead 110 with a tubular 104 extending into a wellbore 105, the BOP 108 and a (subsea) controller 128. The BOP 108 may be, for example, a conventional electro-hydraulic BOP. The BOP 108 as shown has a ram assembly 102 for engaging a tubular. Such engaging may involve, for example, sealing about or shearing the tubular 104, and/or sealing the wellbore.

The surface system 120 and subsea system 106 may be provided with one or more controllers 126, 128 located at various locations to control the surface system 120 and/or the subsea systems 106. The controller 128 may include electrical and/or hydraulic controllers for activating the BOP 108. For example, the controller 128 may include accumulators and/or other devices to selectively apply fluid under pressure to activate the ram assembly 102. Communication links 134 may be provided for communication between the controllers 126, 128 and various parts of the wellsite 100.

The BOP 108 also has a monitoring system 111 for monitoring the BOP 108. The monitoring system 111 includes a cable 135 extending from the BOP 108 to the surface platform 124. The cable 135 may include a BOP cable 137 as part of, or coupled to, the BOP 108 for collecting data (e.g., BOP acoustic signals.) The BOP cable 137 may be used to collect acoustic signals from the BOP and/or associated equipment, for example indicating certain events, motion or operation of the BOP (e.g., event detection). The BOP cable 137 may be connectable to portions of the BOP (e.g., housing, rams, etc.) and/or equipment used with the BOP (e.g., wellhead, accumulator, portions of the lower marine riser package (LMRP), etc.) This BOP cable 137 may be used to register acoustic signals to monitor movement of BOP components, such as rams, annulars, and the valves on the choke and kill likes.

A data storage device 136 may be coupled to the cable 137. Download capability may be provided for signal analysis. A remote operated vehicle (ROV) 141 or other connection may be provided to link to the cable 137, and/or data storage device 136 may be provided for downloading. The BOP cable 137 may be connected to the BOP 108, for example, by a wet connect.

The cable 135 may also have a communication cable 139 for providing communication between the BOP 108 and the surface system 120. The communication cable 139 may provide constant, intermittent and/or selective communication between the surface system 120 and the BOP 108. The communication may be used to pass data, power and/or command signals, such as those provided from cable 135. While only one cable 135 with one BOP cable 137 and one communication cable 139 is shown, one or more cables may be provided for collecting and passing data as needed. Optionally, the cable 135 may be coupled, for example, to the communication links 134 for providing the desired communication.

While the monitoring system 111 is depicted at a subsea location at a wellsite, the monitoring system 111 may optionally be performed at a surface location, a landbased location, etc. The monitoring system 111 may also be part of a test system for testing prior to insertion at a wellsite as will be described more fully herein. Monitoring may be performed at manufacture (e.g., to confirm function), prior to use, at the wellsite (e.g., to confirm operability during wellsite operations), at overhaul, etc.

Figure 2:
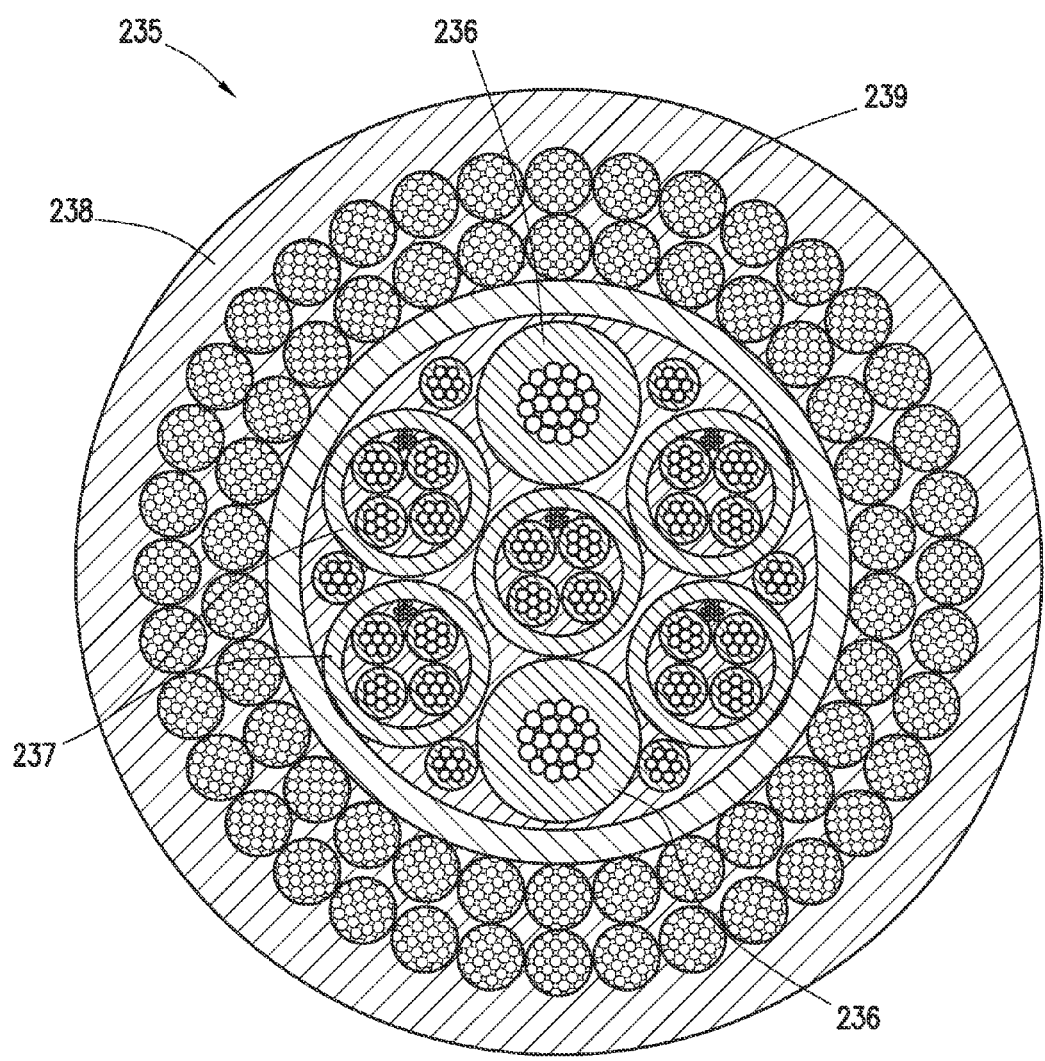
FIG. 2 is a cross-sectional view of a monitoring cable.

FIG. 2 shows an example cable 235 that may be usable, for example, as the cable 135 is shown in FIG. 1. As shown in this view, the cable 235 may be, for example, a multiplexer (MUX) cable with various communication lines therein. The communication lines may be contained within the cable jacket (or covering or shielding) 238. The cable 235 may be armored with wiring 239 for protection and strength, and finished with a polyurethane outer cable jacket.

The cable 235 may have a number of cables therein, such as a fiber optic cable 236 and communication lines 237. The communication lines 237 may be, for example, conventional copper shielded twisted pairs. The fiber optic cables 236 may be used to convey the acoustic signals acquired at the BOP (e.g., 108 of FIG. 1) for analysis at surface. The fiber optic cables may be conventional fiber optic cables capable of obtaining acoustics, for example, by listening to light. The cable 235 may include additional cables, such as a BOP cable (e.g., 137 of FIG. 1) and a communication cable (e.g., 139 of FIG. 1), to acquire acoustic signals and/or to communicate about the wellsite. Other cables, such as power, fluid, electrical or other cables may also be provided.

Figure 3A:
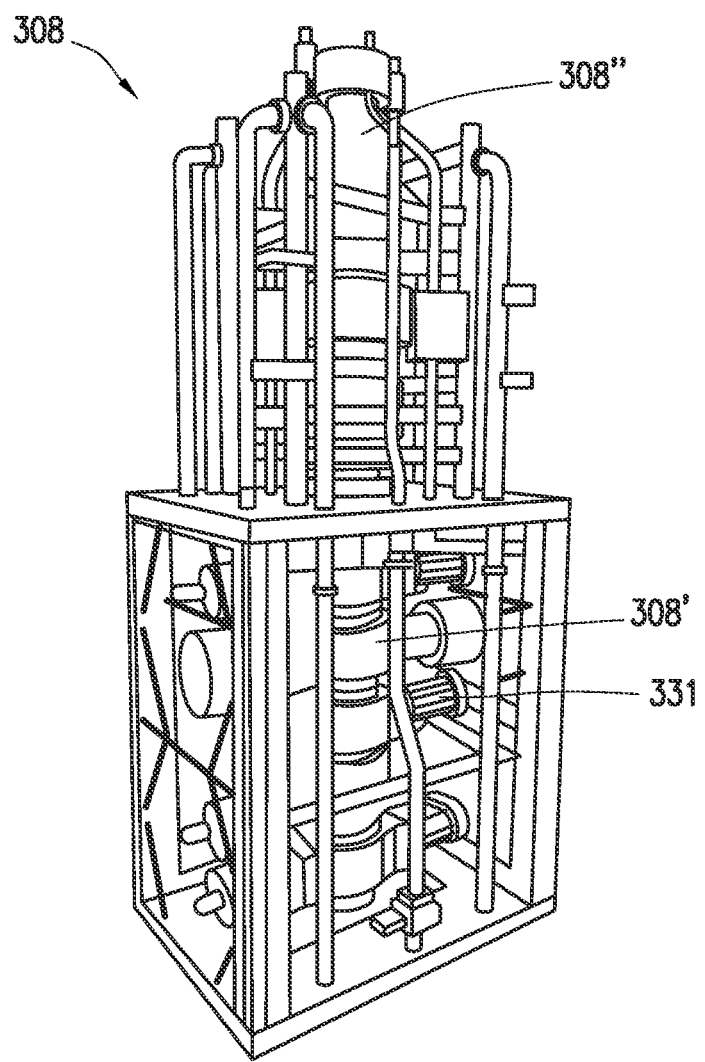
FIGS. 3A-3C are various schematic views of a blowout preventer (BOP) with a ram assembly and an annular.
Figure 3B:
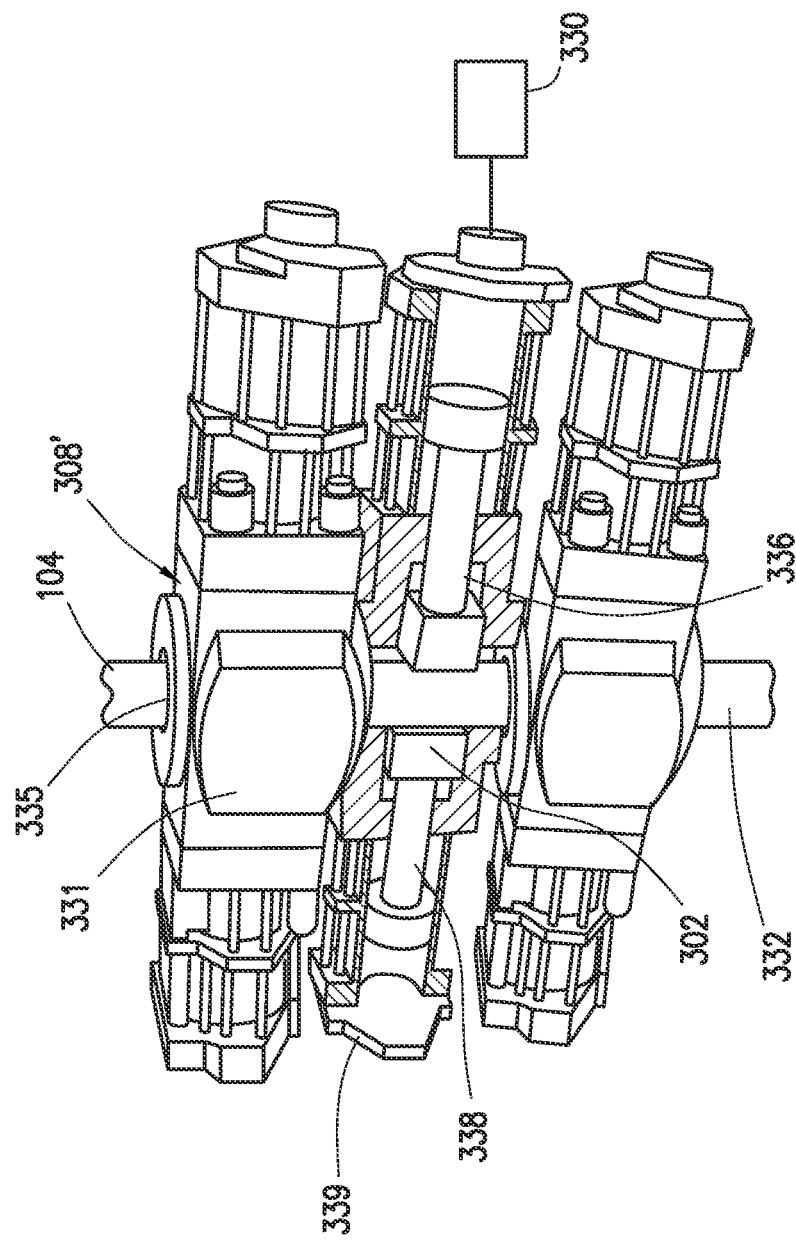
Figure 3C:
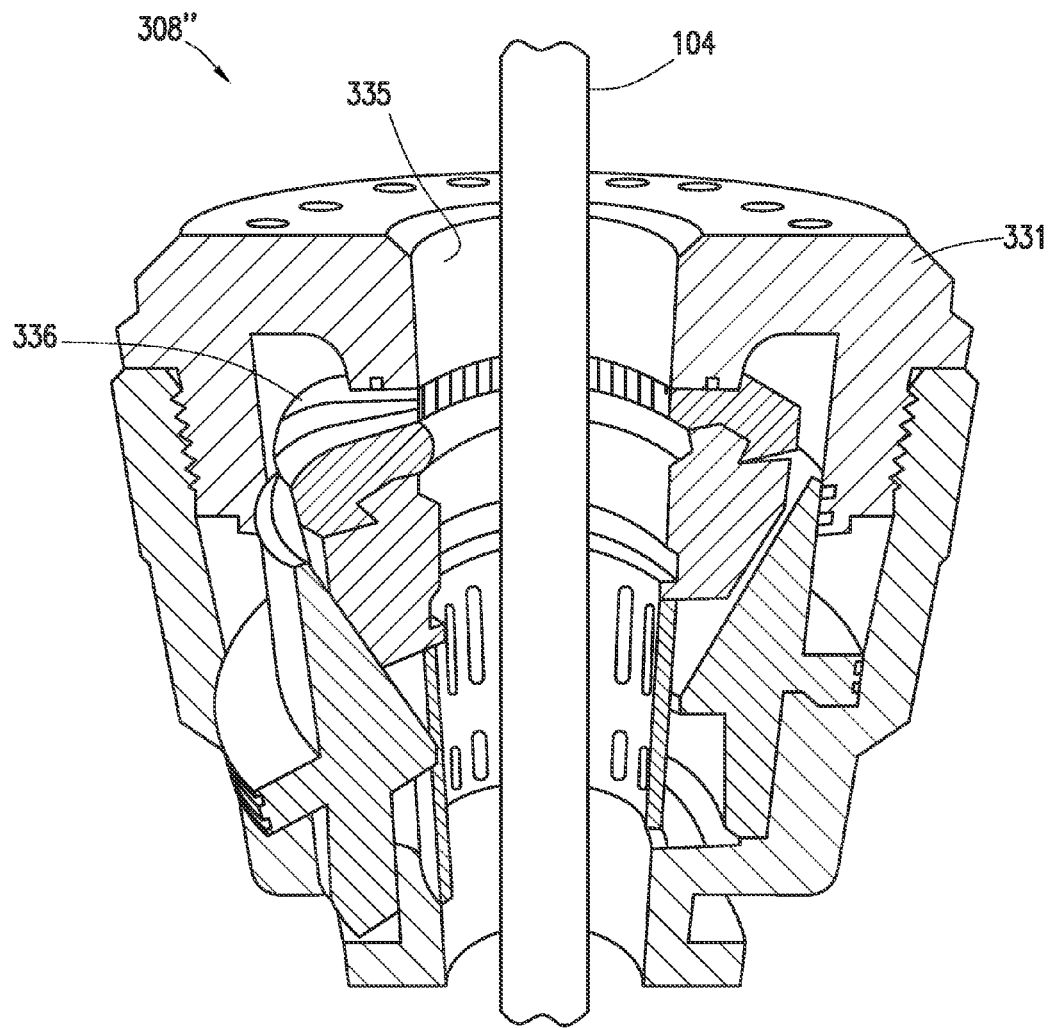

FIGS. 3A-3C depict views of a BOP stack 308, a ram BOP 308', and an annular BOP 308" usable as the BOP 108 of FIGS. 1A and 1B. FIG. 3A is a perspective view of the BOP stack 308. FIG. 3B is a longitudinal cross-sectional view of the ram BOP 308'. FIG. 3C shows a portion of the annular BOP 308" depicting an annular 334. The BOP stack 308 may include one or more ram BOPs 308' and/or annular BOPs 308". The BOPs 308', 308" each have a housing 331 with a cavity 335 for receiving tubular 104 therethrough, and a connector 332 at a downhole end. The connector 332 may be, for example, a wellhead connector for connection to a wellhead (e.g., 110 of FIG. 1A) or a BOP connector for connector to other portions of the BOP stack 308.

As shown in FIG. 3B, the ram BOP 308' may include multiple stacks with rams 302 and ram cavities 336 therein. The rams 302 close and open about pipe 104 by an actuator 330, such as a hydraulically driven piston 338 and cylinder 339. The ram BOP 308' may be used to contain fluid and pressure, hang off drillstring equipment and facilitate downhole pressure tests. The rams 302 may be conventional pipe rams, blind rams, shear rams, variable bore rams, seal rams or other rams movable within the ram BOP 308' for engagement with the tubular 104. Examples of a BOP with rams usable as the ram BOP 308 are provided in U.S. Pat. No. 7,243,713, the entire contents of which is hereby incorporated herein.

As needed, the rams 302 may be configured to engage (e.g., seal and/or sever) the tubular 104 upon actuation by the actuators 330. The actuators 330 are operatively connected to the rams 302 for selectively activating the rams 302. The BOP 308 may be activated, for example, by hydraulic pressure from remote accumulator bottles, or by one of the multiple control stations at surface (e.g., controller 126). The BOP 308' may be controlled by a combination of hydraulics and electronics. Electro-hydraulic BOP control systems, such as controller 126, 128 of FIG. 2, may be used to provide the rapid actuation of the subsea BOP 308.

FIG. 3C shows an annular BOP 308" with pipe 104 extending therethrough. The annular 334 has a plurality of fingers 336 encircling the pipe 104 for engagement therewith. The fingers 336 may be configured to engage (e.g., seal and/or sever) the tubular 104 upon actuation by an actuator (e.g., 330 of FIG. 3B). Examples of annulars BOPs are provided in U.S. Pat. No. 5,662,171, the entire contents of which is hereby incorporated herein.

Figure 4A:
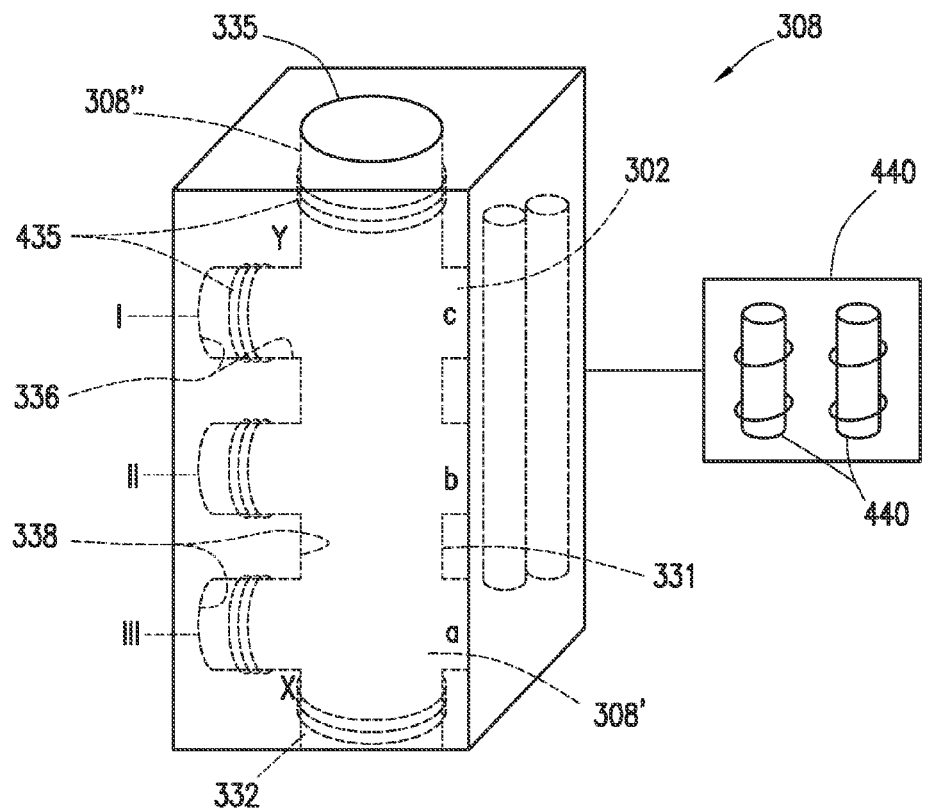
FIGS. 4A-4C are schematic views of portions of a BOP depicting fiber optic cables attached thereto.
Figure 4B:
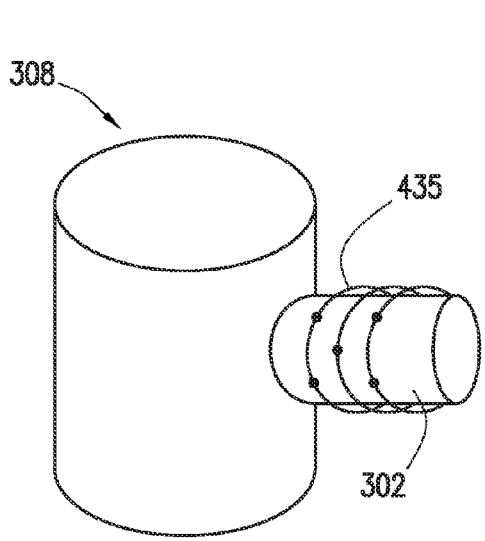

The operation of the BOP stack 308 may be sensed using, for example, the monitoring system 111 and/or cable 135 of FIGS. 1A and 1B. The cable 135 may be connected about various portions of the BOP stack 308 in various configurations as depicted in FIGS. 4A-4E. FIG. 4A shows a schematic view of measurement locations about the BOP stack 308. FIG. 4B shows a portion of the BOP stack 308 depicting measurement of a ram BOP 308'. FIG. 4B shows a portion of the BOP stack 308 depicting measurement of the annular BOP 308".

Figure 4C:
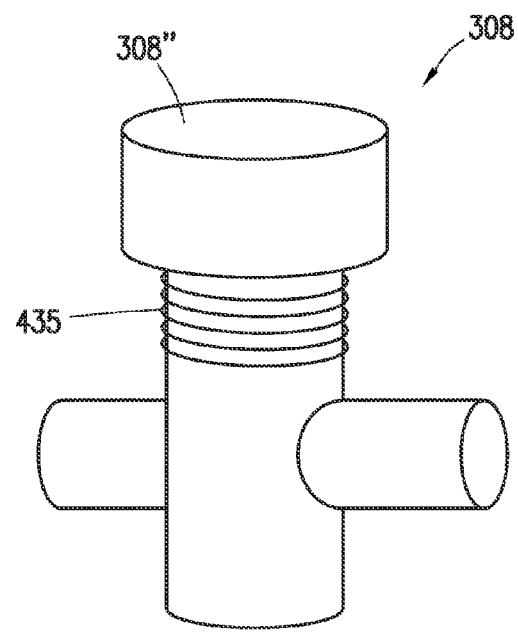
Figure 4D:
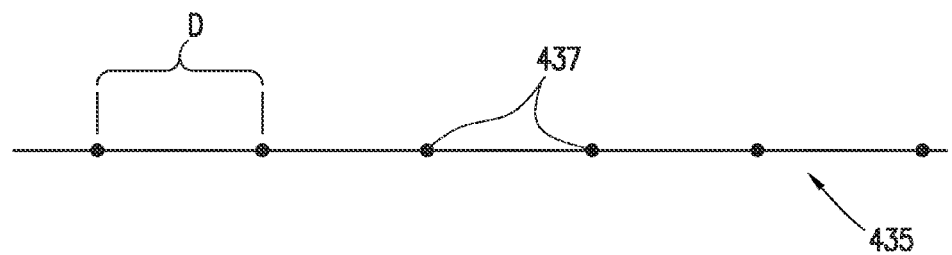
FIGS. 4D-4E are schematic views of fiber optic cable usable with a BOP.
Figure 4E:
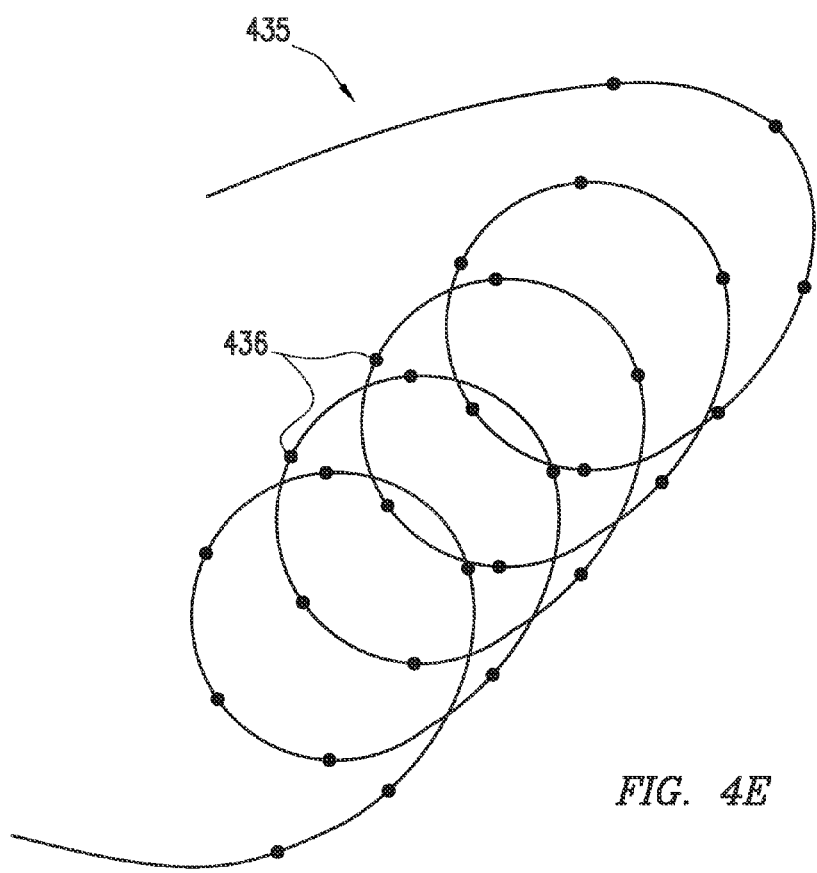

FIGS. 4A-4C provide example configurations for measuring BOP parameters. FIGS. 4D and 4E depict measurements taken along the cable 135. Data analysis acquired by a fiber optic cable can be used to provide an acoustic signal originating about every meter of fiber optic cable. As the cable is wrapped over a circumference of a component of the BOP stack 308, a measurement may be obtained or acquired from various orientations along the component.

As shown in FIG. 4A, fiber optic cable 435 (which may be similar to fiber optic cables 135 or 235) may be connected to various positions about the BOP stack 308, such as the housing 331, the ram BOP 308', the annular BOP 308", lower marine rise package (LMRP), wellhead connector 332, etc. The fiber optic cable 435 may be connected about the BOP stack 308 using, for example, Briggs grating fixtures to detect operation components of the BOP, such as the rams 302 in each of the ram cavities 336.

Position X on BOP 308 shows the fiber optic cable 435 wrapped about the wellhead connector 332 near a downhole end of the BOP stack 308. Position Y on the BOP stack 308 shows the fiber optic cable 435 wrapped about and the annular BOP 308" near surface end of the BOP stack 308. The fiber optic cable 435 may also be connected about rams 302 at points a, b, c, or in wrappings I, II, III about the ram pistons 338 of the ram BOP 308'.

As also shown in FIG. 4A, the BOP stack 308 may have components operatively connected thereto for operation therewith. For example, a wellhead may be connected to wellhead connector 332. In another example, an accumulator 439 with accumulator bottles 440 may be coupled to the BOP stack 308 for selectively activating BOP engagers, such as rams 302 of FIG. 3B or fingers 336 of FIG. 3C used to engage (e.g., seal and/or sever) a tubular. Fiber optic cable 435 may be positioned about the BOP stack 308 and/or other components, such as the wellhead connector 332 and/or accumulator bottles 440.

As shown in FIG. 4B, the fiber optic cable 435 may be connected to a ram 302 of the ram BOP 308' by wrapping the fiber optics cables 435 therearound. The fiber optic cable 435 may be used for acoustic measurement, to determine the functioning of the rams 302 and/or the ram BOP 308'. The fiber optic cables 435 are attached to each of the rams 302 by way of wrapping around an outer surface thereof. As shown in FIGS. 4A and 4B, the fiber optic cable 435 may be wrapped about the BOP stack 308 adjacent the annular BOP 308' and/or cavity 335 in the housing 331.

The fiber optic cable 435 may be wrapped about the BOP stack 308 to capture acoustic information at discrete intervals along the fiber optic cable to capture 'noise-generating' events from various portions of the BOP stack 308. Through the wrappings, measurements of a single event are acquired at a multitude of locations about a circumference of the BOP stack 308. The cable 435 may be used to provide an encompassing detection of BOP events. The fiber optic cable 435 may capture acoustic events, for example, at discrete measurement locations at about 1 meter apart. By increasing the number of wrappings incremental measurements may be provided to deliver the desired signal definition.

Table 1 shows an example of measurements obtained in four sectors about the ram 302 for a ram diameter of 0.4 m, as the circumference is 1.25 m and a measurement is made at each meter.

TABLE 1

Number of measurement sectors for a fiber optic measurement each meter, based on circumference and diameter of the ram.

| Diameter (m) | Circumference (m) | Sectors |
| --- | --- | --- |
| 0.40 | 1.25 | 4 |
| 0.48 | 1.50 | 2 |

For example, a given configuration whereby a measurement may be obtained at two sectors and at four sectors. Different configurations (e.g., the number of wrappings) may be selected to yield desired signal acquisition from a variety of sectors. Redundancy may be used for additional analysis capability. The acoustic measurements may be gathered at intervals 437 of the cable 435 at a distance D (e.g., about every one meter (1 m)) as shown in FIG. 4D and as indicated in Table 2 below.

TABLE 2 example capabilities by fiber providers: a measurement at each meter along the fiber.

| | |
| --- | --- |
| Location Accuracy | Records Data From Every Meter Along Fiber |
| Bandwidth Range | Variable: 10 khz Typical For Every Recorded Sample Over 50 Km Of Fiber Can Be Monitored In Real Time |
| System Sensitivity | High Sensitivity System |
| Field Results | The Data Is Available In Real Time And Can Be Programmed For Event Recognition |
| System Set Up Stream Sound Communications Ready | Helios Can Be Set Up And Monitored Locally Or Remotely From Any Point In The Fiber Data Ban Be Sent Over Any Data Link |
| UL/CE Approval | Approved |

The measurement intervals 437 are depicted in FIG. 4D as points along the cable 435 at a distance D (e.g., about 1 m). As shown in FIG. 4E, the cable 435 may be wrapped to provide windings with the measurement intervals 436 along the diameter of a component, such as the BOP stack 308 as shown in FIG. 4A, the rams 302 of FIG. 4B and/or the annular BOP 308" of FIG. 4C.

Once connected in position, the fiber optic cables 435 may be used for communication between the BOP and various locations, such as surface and downhole controller 126, 128 of FIGS. 1A and 1B.

While FIGS. 4A-4E show specific configurations of cable 435 positioned about a BOP, the cable 435 may be pre-installed (e.g., by an original equipment manufacturer) into the BOP upon manufacture, and/or installed after manufacture. The BOP housing 331 may optionally be provided with grooves or other receptacles for receiving the cable 435.

Figure 5A:
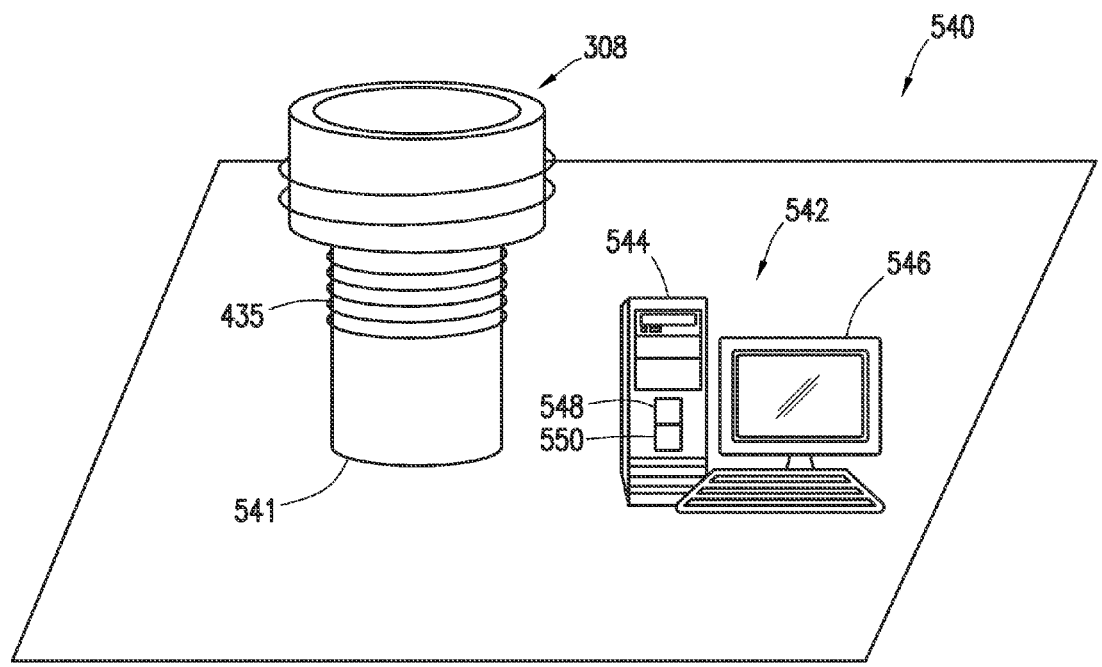
FIGS. 5A-5B are schematic views of a BOP test stump.
Figure 5B:
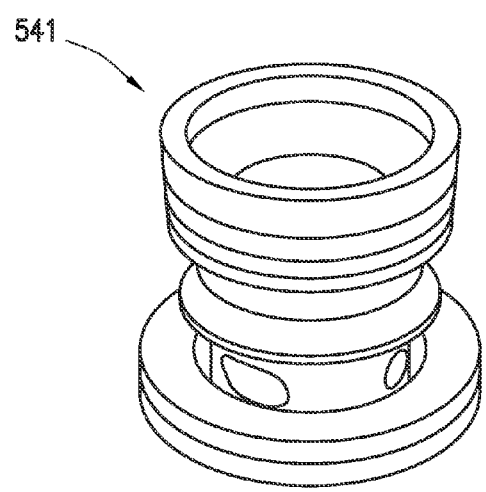

Optionally, the BOP stack 308 and/or BOPs 308', 308" may be tested prior to insertion into position at a wellsite. As shown in FIGS. 5A and 5B, portions of the BOP stack 308 with a fiber optic cable 435 thereabout is removably connectable to a test stump (or bench) 541. FIG. 4A shows a portion of the BOP stack 308 attached to the test stump 541. FIG. 5B shows the test stump 541. The portion of the BOP 308 may be function and pressure tested in the manufacturing and servicing facility by latching or connecting the BOP 308 onto the test stump 541. The test stump 541 may be part of a test system 540. The test stump 541 and/or test system 540 may be positioned, for example, at a rig, a shop, platform, onshore, offshore, etc.

The test system 540 includes a data acquisition system 542. The data acquisition system 542 includes a surface computer 544, a monitor 546, a database 548 and a processor 550. The data acquisition system 542 may be, for example, an oscillator operatively coupled to the fiber optic cable 236 for receiving and/or measuring data therefrom. The wellsite 100 may be provided with similar capabilities for data collection and analysis. The data acquisition system 542 may be positioned at the wellsite (e.g., at controller 126 of FIG. 1) and send the data to the surface computer 544 for storage in database 548 and processing by processor 550. The controllers 126 and/or 128 (FIG. 1) may then send commands to the wellsite based on the analyzed data.

FIGS. 6A-6I show graphs of various outputs that may be generated by the fiber optic cable and measured by a BOP monitoring system as described herein. The various outputs provided by the BOP monitoring system may be stored at the wellsite and/or conveyed to a surface location. These outputs depict detectable variations of the output by, for example, the BOP 108 as detected by the fiber optic cable (e.g., 135 of FIG. 1A). Such variations may be analyzed for determining variations in BOP operation that may indicate failure, wear, changes in operating conditions, and/or other variables.

Figure 6A:
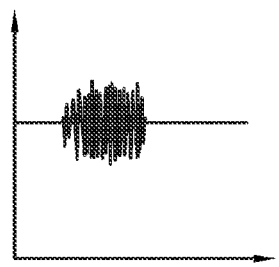
FIGS. 6A-6I are graphs depicting various outputs of a BOP monitoring system.

Each graph shows time (x-axis) versus frequency (y-axis). Signal amplitudes from the graphs may be interpreted. An amplitude may be represented as the height of a 3D surface, or by color or intensity. FIG. 6A may be a baseline or an indication of a normal operation. The normal operation may be determined, for example, by a stump test using the devices of FIGS. 5A and 5B. The normalized operation provides a fingerprint of the functioning of portions of the BOP stack, such as ram BOP 308' or annular BOP 308" (e.g., FIGS. 3B-3C). The fingerprint shows the piston movement, and entry of hydraulic oil as it enters a chamber through detection of the acoustic signal using the fiber optic cable. The fiber optic cable may be used to register the entire movement from start to finish.

Figure 6B:
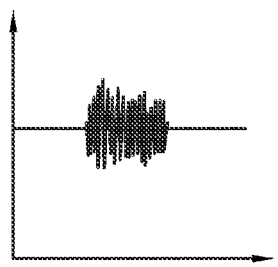
Figure 6C:
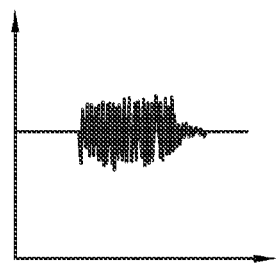
Figure 6D:
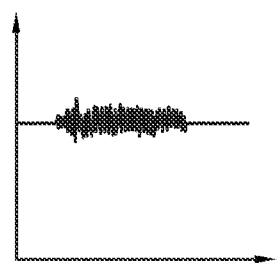
Figure 6E:
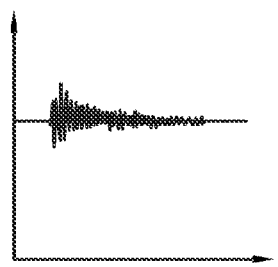
Figure 6F:
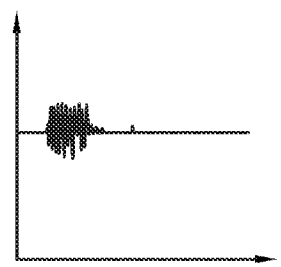
Figure 6G:
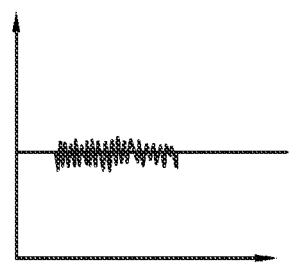

Variations in any graph may indicate a problem as shown in FIGS. 6B-6G. FIG. 6B shows actuation, or the start of movement was delayed, compared to the baseline finger print of FIG. 6A, but the duration was identical. FIG. 6C shows slower actuation, and slower duration, but at the same amplitude. FIG. 6D shows the same actuation, but longer duration and smaller amplitudes, so less hydraulic energy seems to be available. FIG. 6E shows the same actuation, but loss of hydraulic energy is experienced, thereby indicating a leak. FIG. 6F shows the same actuation, but smaller duration, indicating a piston (ram or annular, or valve) is partially functioning (opening or closing). FIG. 6G shows lower acoustic levels (lower amplitude) and longer duration, thereby indicating increased wear. The acoustic signal acquisition and analysis may be used to provide real time insight into the operation of BOP components and/or provide diagnostics capabilities. This information may be used, for example, to allow for scheduling preventative maintenance by tracking the wear of components.

Figure 6H:
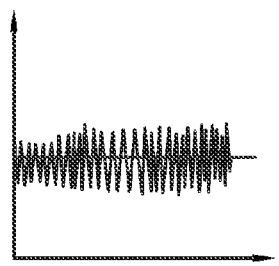
Figure 6I:
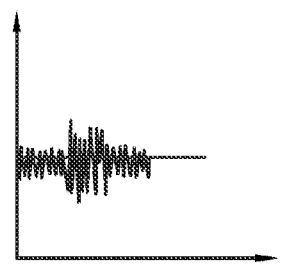

FIGS. 6H and 6I show graphs generated by an oscillogram. FIG. 6H shows an increased amplitude over time, which indicates an increase in flow rate in the BOP. In FIG. 6I, there is a period of increased flowrate. These changes may indicate activity in the BOP, or problems. Analysis of the graphs may be used to determine trends or potential issues.

As shown in FIGS. 7A1-7C2, spectrogram analysis may be used to help distinguish between a number of BOP events. For example, by examining spectrograms generated from fiber optic data, BOP events, such as cutting build up that leads to a pack off or a kick or gas entering into the riser, may be detected. The spectrograms may be a time-varying spectral representation showing how the spectral density of an acoustic signal varies with time. The spectrogram may be a voiceprint or fingerprint.

FIGS. 7A1-7A3 show generation of the spectrograms of a BOP monitoring system, such as the systems described herein. Visualization 750 of acoustic amplitude, spectrogram 752, and frequency 754 are depicted in FIG. 7A1-7A3, respectively, for comparison and analysis. Various diagrams may be generated for analysis, such as those depicted herein.

Spectrograms may also be used to allow for comparison between BOP tests conducted at different times. FIGS. 7B1 and 7B2 show a comparison of expected (or modeled) spectrogram 756 and actual spectrogram 758, respectively, for an event. FIGS. 7C1 and 7C2 show a graph 760 and a spectrogram 762, respectively, depicting the temporary increase in amplitude, possibly showing an increased flow rate in the wellbore or a substance at higher fluid density.

In operation, the BOP monitoring system may test the BOP to provide, for example, a fingerprint of the rams and annulars. During factory acceptance tests or a stump test, a finger print (e.g., spectrogram or oscillator) may be obtained. Through analysis, the fingerprint may be compared with Original Equipment Manufacturer (OEM) tests. During BOP operation, the fingerprints may be obtained and compared with previously acquired fingerprints. A baseline may be established and compared with other devices, or the same device over time. The acoustic signals may reveal the operation of activated components and trends may reveal mechanical wear and tear, leakage of hydraulic fluid, etc. Based on the data collected, preventative and/or predictive maintenance may be scheduled. Adjustments in operation, preventative maintenance and/or other actions may be taken to enhance BOP life, reliability, performance and/or other operational parameters.

The data may be generated online and/or offline, and output at desired intervals. The data may be, for example, high resolution data with real time (RT) mode and download mode. The output may be used to analyze BOP performance and for providing impact design, reducing overdesign, simplifying systems, and reducing weight. The data may also be used to provide early warnings for possible problems.

Figure 8A:
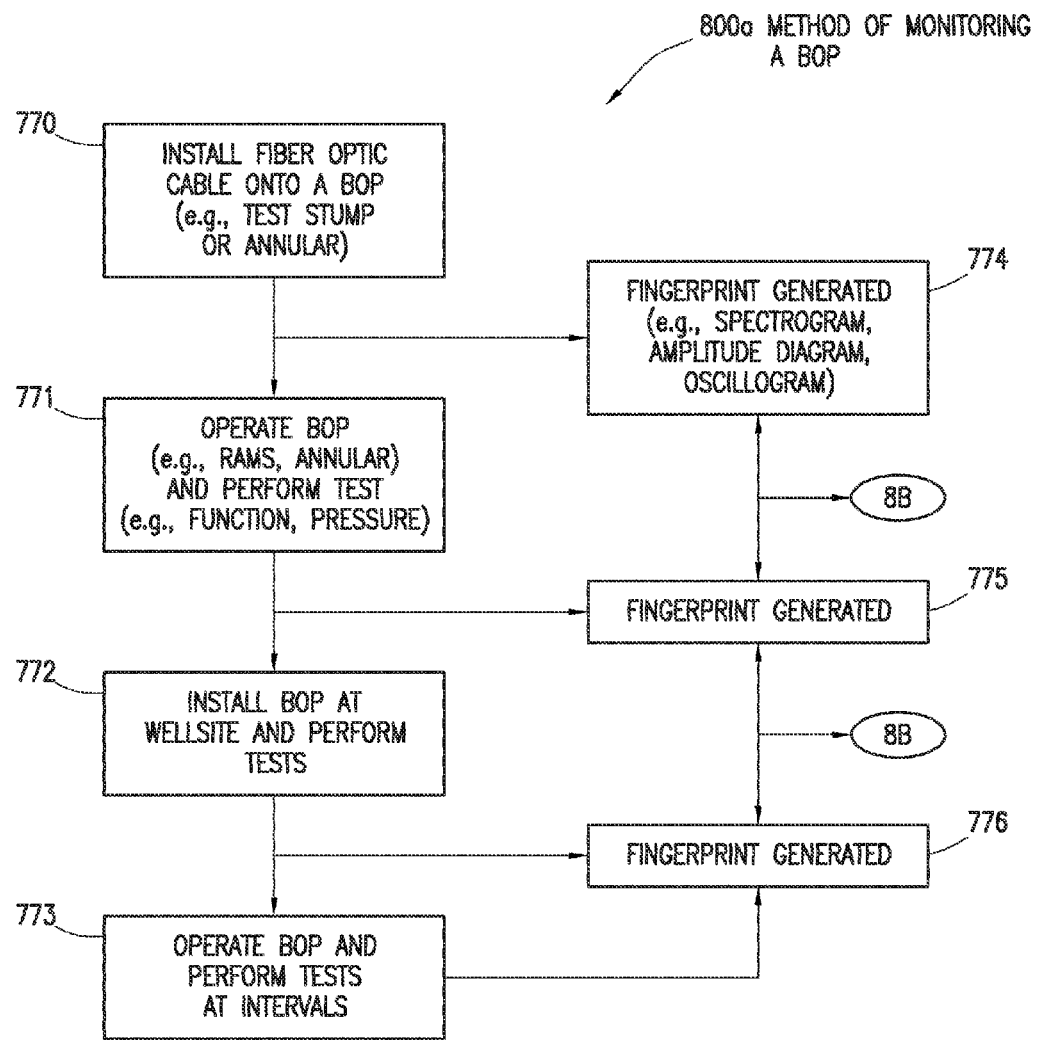

FIGS. 8A-8D depict various methods of monitoring a BOP. FIG. 8A depicts a method 800*a* of monitoring a BOP. This method involves installing fiber optic cable onto the BOP 770. The BOP may be operated at a test environment 771, such as at an OEM facility or a test stump, as shown in FIGS. 5A-5B. The BOP may also be installed and tested at the wellsite 772. The BOP may then be operated at various intervals 773. Each test may involve a function and/or a pressure test.

After each test, a fingerprint may be generated 774, 775, 776 from an acoustic signal received by the fiber optic cable (e.g., 135 of FIG. 1). The fingerprint may be from an oscillogram as shown in FIGS. 6A-6I or a spectrogram as shown in FIGS. 7A-7C. The fingerprints may be compared and analyzed at each of the tests. Fingerprints from the various tests may be compared and analyzed.

Figure 8B:
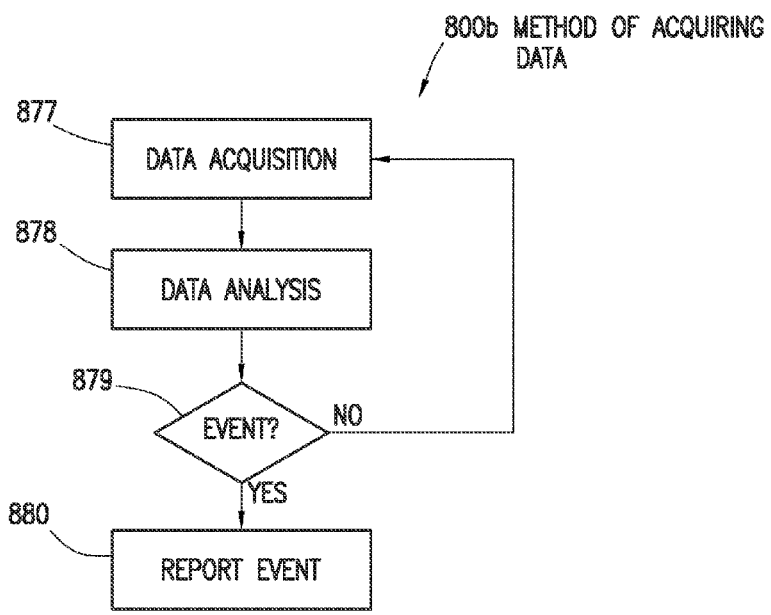

A method of data acquisition 800*b* is shown in a feedback loop as depicted in FIG. 8B. Data is acquired 877, analyzed 878, and events are detected 879. If an event is detected, it may be reported 880. If not, data acquisition can continue.

Figure 8C:
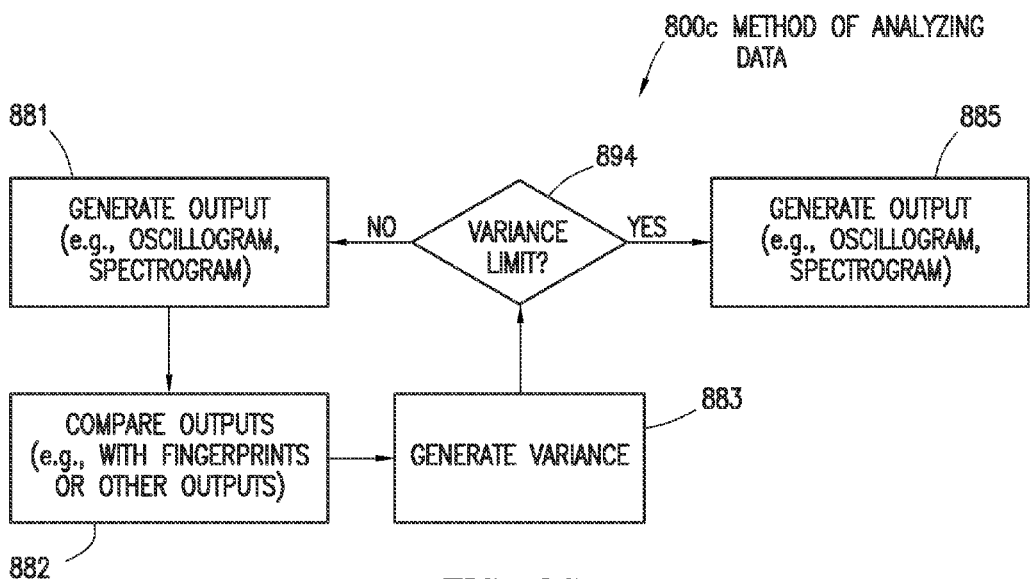

A method of data analysis 800*c* is also shown in a feedback loop as shown in FIG. 8C. Output is generated 881 and compared 882 to generate variances 883. If the variance exceeds a given limit or criteria 884, the variance may be reported 885. If not, the generating 881 may continue. Based on the results, further tests, adjustments and/or repairs may be made as needed. Reports and/or displays may also be generated as needed.

FIG. 8D depicts an example method 800*d* of monitoring a BOP. In operation, an acoustic signal is acquired from the BOP 886, and fingerprints of the operation of the BOP components are generated 887. Data from the signal is stored for later download and analysis 888. The acoustic signal may be conveyed to the surface for analysis 889. The acoustic signal defines a fingerprint for analysis (e.g., comparison with prior fingerprints from OEM or other tests) 890. Reports may be generated 891 based on the analyzed data and/or fingerprint comparisons. The signals can be detected in real time to monitor or detect the functioning of BOP components 892. The fingerprints may also be used for monitoring events 895 (e.g., cutting build up, kicks etc.), for troubleshooting 893, and/or for scheduling preventative maintenance 894.

Figure 8E:
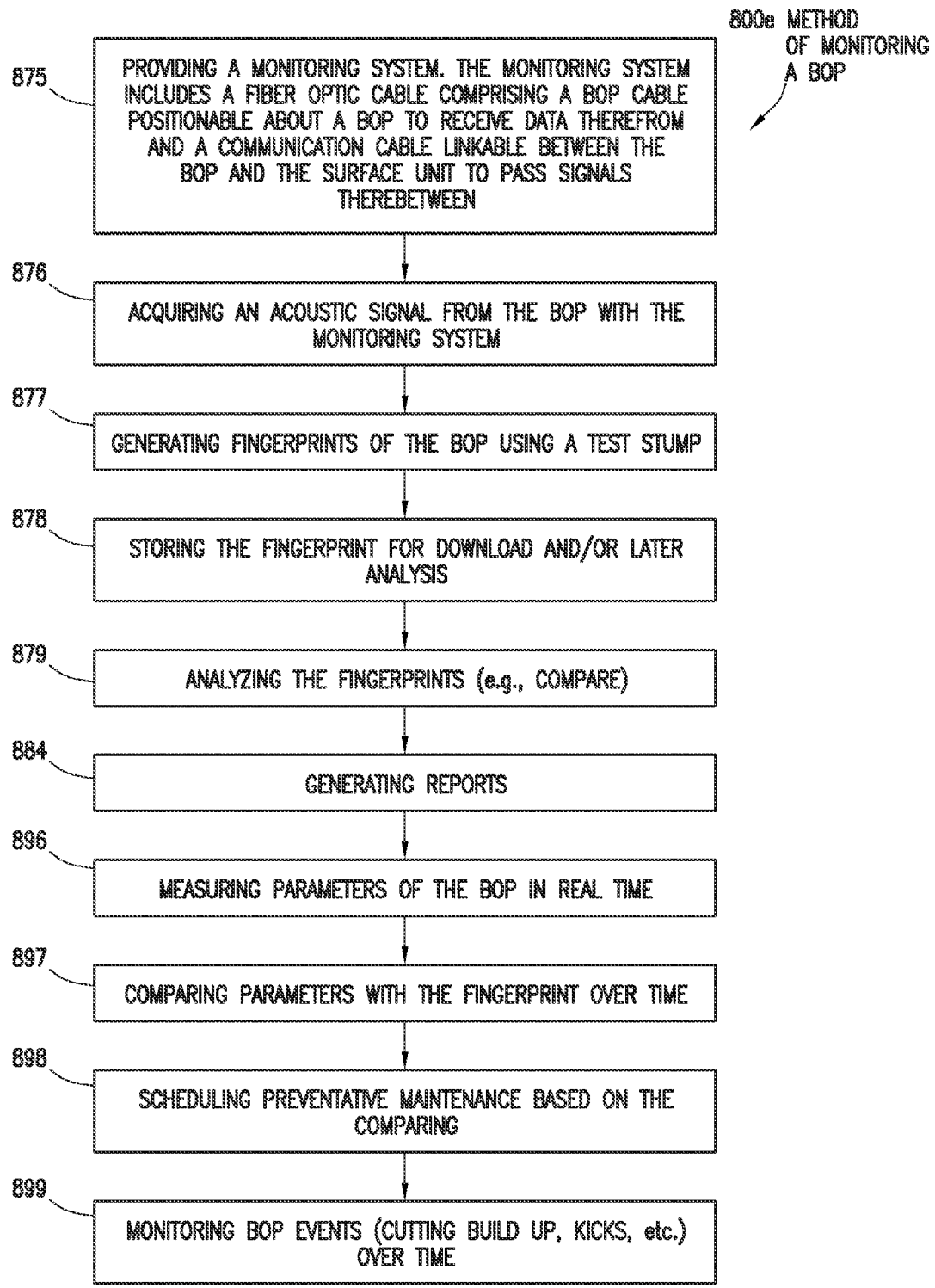

FIG. 8E depicts an example method 800*e* of monitoring a BOP. The method involves 875—providing a monitoring system. The monitoring system includes a fiber optic monitoring cable operatively connecting the blowout preventer to a surface unit and a data storage device operatively coupled to the blowout preventer cable to receive data therefrom. The monitoring cable includes a blowout preventer cable operatively connectable to the blowout preventer to receive data therefrom and a communication cable to pass signals between the blowout preventer and the surface unit, the monitoring cable comprising a fiber optic cable.

The method 800*e* also involves 876—acquiring an acoustic signal from the BOP with the monitoring system, 877—generating fingerprints of the BOP using a test stump, 878—storing the fingerprint for download and/or later analysis, 879—analyzing the fingerprints, 884—generating reports, 896—measuring parameters of the BOP in real time, 897—comparing parameters with the fingerprint over time, 898—scheduling preventative maintenance based on the comparing, and 899—monitoring BOP events (cutting build up, kicks etc.) over time.

The method may be performed in any order including any tests and/or fingerprints as desired, and repeated as needed.

It will be appreciated by those skilled in the art that the techniques disclosed herein can be implemented for automated/autonomous applications via software configured with algorithms to perform the desired functions. These aspects can be implemented by programming one or more suitable general-purpose computers having appropriate hardware. The programming may be accomplished through the use of one or more program storage devices readable by the processor(s) and encoding one or more programs of instructions executable by the computer for performing the operations described herein. The program storage device may take the form of, e.g., one or more floppy disks; a CD ROM or other optical disk; a read-only memory chip (ROM); and other forms of the kind well known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Aspects of the invention may also be configured to perform the described functions (via appropriate hardware/software) solely on site and/or remotely controlled via an extended communication (e.g., wireless, internet, satellite, etc.) network.

While the embodiments are described with reference to various implementations and exploitations, it will be understood that these embodiments are illustrative and that the scope of the inventive subject matter is not limited to them. Many variations, modifications, additions and improvements are possible. For example, one or more tests using one or more fingerprints and/or real time measurements may be performed and/or compared for detection of issues with BOP operation.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A monitoring system for a blowout preventer positionable about a wellbore, the blowout preventer comprising a housing for receiving a tubing and engagers to engage the tubular, the monitoring system comprising:
   a fiber optic cable comprising a blowout preventer cable and a communication cable, the blowout preventer cable positionable about the blowout preventer to receive data therefrom, the communication cable linkable between the blowout preventer portion and a surface unit to pass signals therebetween whereby blowout preventer events are detectable; and
   a processor to: analyze acoustic signals acquired by the blowout preventer cable during operation of the blowout preventer to identify an anomaly in operation of the blowout preventer, the analysis comprising identification a leak in the blowout preventer based on detection of an asymptotic decay of the acoustic signals after actuation of a piston of the blowout preventer.

2. The monitoring system of claim 1, wherein the blowout preventer cable is wrapped about portions of the blowout preventer to define windings with measurement locations therealong.

3. The monitoring system of claim 2, wherein the measurement locations are 1 m apart along the blowout preventer cable.

4. The monitoring system of claim 1, further comprising a data storage device operatively coupled to the fiber optic cable to receive data therefrom.

5. The monitoring system of claim 1, wherein the blowout preventer cable is wrapped about portions of the blowout preventer, the portions comprising a ram, a piston, a cylinder, an annular, the housing, a wellhead connector, and combinations thereof.

6. The monitoring system of claim 1, wherein the blowout preventer cable is operatively connectable about at least one of an accumulator, an accumulator bottle, a lower marine riser package, a wellhead, and combinations thereof.

7. The monitoring system of claim 1, further comprising a test system operatively connectable to the blowout preventer and the fiber optic cable to measure a fingerprint thereof.

8. The monitoring system of claim 1, wherein the test system comprises a test stump to receive the portion of the blowout preventer and a data acquisition to receive data from the blowout preventer.

9. The monitoring system of claim 1, further comprising a data acquisition system operatively connectable to a data storage device by a monitor cable.

10. The monitoring system of claim 1, wherein fiber optic cable comprises a cable jacket, wiring, fiber optic cables, communication lines, and an outer jacket.

11. The monitoring system of claim 1, wherein the blowout preventer cable is positionable in a groove about the housing of the blowout preventer.

12. A method of monitoring a blowout preventer positionable about a wellbore, the blowout preventer comprising a housing for receiving a tubing and engagers to engage the tubular, the method comprising:
   providing a monitoring system, comprising:
      a fiber optic cable comprising a blowout preventer cable and a communication cable, the blowout preventer cable positionable about the blowout preventer to receive data therefrom, the communication cable linkable between the blowout preventer portion and a surface unit to pass signals therebetween; and
   measuring blowout preventer parameters of the blowout preventer with the monitoring system; and
   analyzing acoustic signals acquired by the blowout preventer cable during operation of the blowout preventer to identify an anomaly in operation of the blowout preventer, the analyzing comprising identifying a leak in the blowout preventer based on detection of an asymptotic decay of the acoustic signals after actuation of a piston of the blowout preventer.

13. The method of claim 12, wherein the blowout preventer parameters comprise acoustic measurements.

14. The method of claim 12, further comprising analyzing the blowout preventer parameters.

15. The method of claim 12, further comprising detecting changes in the blowout preventer by determining changes in the parameters over time.

16. The method of claim 15, further comprising detecting wear of the blowout preventer over time.

17. The method of claim 12, further comprising scheduling maintenance based on the detecting.

18. The method of claim 12, further comprising generating outputs from the blowout preventer parameters, the outputs comprising acoustic amplitude, spectrogram, frequency, modeled spectrogram, and actual spectrogram.

19. The method of claim 18, further comprising comparing the outputs.

20. The method of claim 12, further comprising operatively connecting the monitoring system to a test system and measuring baseline parameters with the monitoring system.

21. The method of claim 20, further comprising comparing the blowout preventer parameters with the baseline parameters.

22. The method of claim 12, wherein the measuring comprises performing data acquisition in a feedback loop.

23. A method of monitoring a blowout preventer positionable about a wellbore, the blowout preventer comprising a housing for receiving a tubing and engagers to engage the tubular, the method comprising:
   generating a fingerprint of the blowout preventer by operatively connecting the blowout preventer to a test stump and measuring a first signal of the blowout preventer with a fiber optic cable;
   positioning the blowout preventer about the wellbore with the tubing therethrough;

generating a second signal of the blowout preventer by linking the fiber optic cable to the blowout preventer after the positioning;

comparing the second signal with the fingerprint to identify an anomaly in operation of the blowout preventer; and identifying, based on the comparing, wear in the blowout preventer based on detection of reduced amplitude and increased duration of the second signal relative to the fingerprint after actuation of a piston of the blowout preventer.

24. The method of claim 23, further comprising monitoring blowout preventer events from the comparing over time.

25. The method of claim 23, further comprising passing the second signal from the blowout preventer to a surface unit.

* * * * *